Jan. 3, 1928.
H. A. MULVANY
1,654,827
SLICE TURNING TOASTER
Filed Nov. 15, 1926
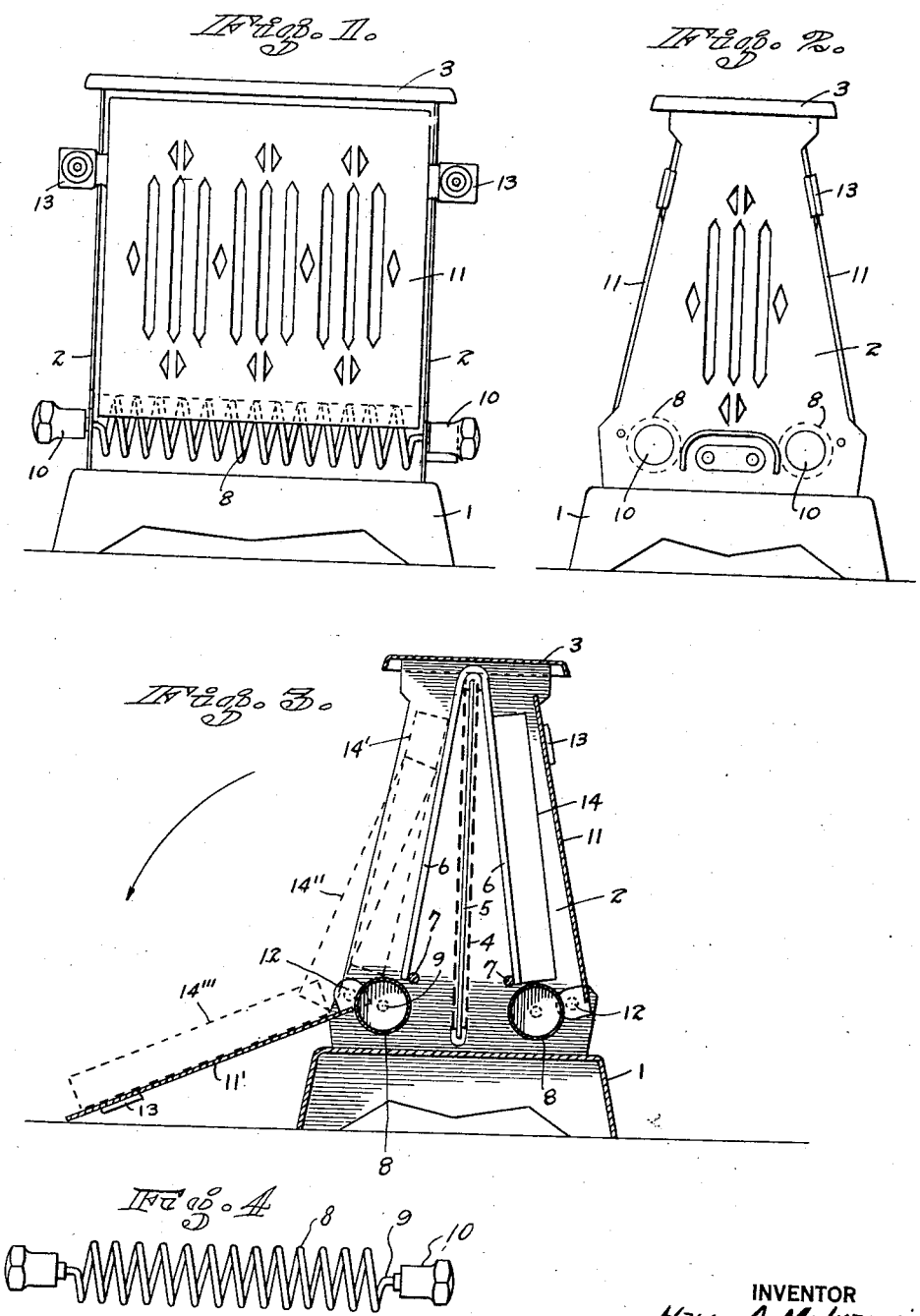
INVENTOR
Harry A. Mulvany
BY Miller & Boyken
His ATTORNEYS Patented Jan. 3, 1928.

1,654,827

UNITED STATES PATENT OFFICE.

HARRY A. MULVANY, OF SAN FRANCISCO, CALIFORNIA, ASSIGNOR TO MAJESTIC ELECTRIC APPLIANCE CO., INC., OF SAN FRANCISCO, CALIFORNIA, A CORPORATION OF CALIFORNIA.

SLICE-TURNING TOASTER.

Application filed November 15, 1926. Serial No. 148,490.

This invention relates to bread toasters, especially such as are heated electrically, and the object of the invention is to provide improved means for turning the toast when one side is done.

On the drawings hereto my improved construction is shown applied to an electrically heated toaster of substantially conventional design.

Figs. 1 and 2 are respectively side and end elevations of the complete toaster, Fig. 3 is a vertical sectional view of the toaster as shown in Fig. 2 but with a slice of bread in toasting position on one reversing roller and with the roller on the opposite side of the toaster being turned to reverse the slice on the downwardly swung retaining leaf.

Fig. 4 is a detached view of the toast-turning roller showing its spiral wire construction.

Briefly described, my improvement consists in providing a specially formed spiral wire roller for supporting the lower edge of the toast and which roller may be turned so as to cause the slice of toast to slide downwardly and outwardly upon one of the usual hinged retaining leaves of the toaster when the same is open so that when the leaf is swung upward or closed the slice will again rest upon the roller but with its opposite side exposed to the heating element.

In the drawings 1 represents the base of the toaster, 2 the end frame plates 3 the top plate, 4 the vertically arranged heating element wound around an insulating support 5 suitably held in place on the frame and guarded by an inverted V shaped wire grill 6 welded or otherwise connected to transversely extending wires 7 anchored in the end plates 2.

Just below the lower ends of the wire grill are rollers 8 made of wire formed into a helix or open spirals and with the ends of the wire providing bearing portions or shafts 9 rotatably extending through the end plates 2 and provided at their extreme ends with knobs 10 by which the rollers may be turned, while positioned outside of the rollers are retaining leaves 11 pivoted at 12 to the end plates so as to swing from a substantially vertical position to a downwardly extending position as shown at 11' in Fig. 3, suitable outwardly projecting grips 13 being provided on the edges of the leaves to facilitate manipulation.

In operation a slice of bread is placed on the rolls as indicated at 14 with one face resting against the grill 6 so as to be toasted by the heat of the elements 4 when the same are energized, and when the side being toasted is finished the leaf 11 is lowered to position 11' and the roll turned in direction of the arrow to carry the lower edge of the slice outwardly to successive positions as indicated at 14'—14'' and whereupon it will slide to position 14'' and may then be swung upward on the leaf 11' to again fall into toasting position with its edge upon the roller 8 but with the opposite side of the slice exposed to the heat.

The toast-turning roller 8 made of a helix or spiralled wire is much cheaper to make than a solid tubular roll as it dispenses with the requirement of securing together of roll, heads, and shafts, as all are formed from a single wire. Besides this, the spaced spirals of wire radiate heat freely to atmosphere and thereby avoid overheating and consequent burning of the edge of the toast.

Attention is called to the fact that while I show an electric source of heat arranged between two of my reversing rolls, no limitation is to be implied thereby as it is manifest that one or any number of my spiralled wire rolls may be arranged adjacent any desired form of heat, and also that while I show complete rollers for effecting the result described it is evident without further illustration that instead of the spirally formed wire rolls, segments of rolls or their equivalent might also be employed, but with complete spiralled wire rolls as shown no reverse movement is required to bring the rolls into operative position.

I claim:

1. A bread toaster provided with means for supporting a bread slice in upright position adjacent a suitable source of heat for toasting the same, a leaf at the outer side of the slice pivoted to the device to swing downwardly at a slant from below the lower end of the slice, and a rotatable support for the lower edge of the slice formed of open spirals of wire adapted upon rotation to carry the toast outwardly to the downwardly slanted leaf.

2. In a toaster of the character described, a horizontally arranged open spiral coil of wire revolvably supported and adapted to support the lower edge of an upright slice of bread, a grill extending upwardly adjacent said coil of wire arranged to support the side of the slice, and a handle on the end of said spiral coil of wire adapted for revolving the coil.

HARRY A. MULVANY.